United States Patent [19]

Sherman

[11] Patent Number: 4,977,701

[45] Date of Patent: Dec. 18, 1990

[54] TAMPER RESISTANT FLYING INSECT CONTROL DEVICE

[76] Inventor: Daniel A. Sherman, 1355 Bobolink Pl., Los Angeles, Calif. 90069

[21] Appl. No.: 438,192

[22] Filed: Nov. 20, 1989

[51] Int. Cl.⁵ .............................................. A01M 1/02
[52] U.S. Cl. .................................................... 43/122
[58] Field of Search ...................... 43/107, 122, 132.1

[56] References Cited

U.S. PATENT DOCUMENTS

| | | | |
|---|---|---|---|
| 722,143 | 3/1903 | Raymond | 43/122 |
| 1,271,355 | 7/1918 | Olejniczak | 43/122 |
| 1,591,854 | 7/1926 | March | 43/122 |
| 3,820,273 | 6/1974 | Novak | 43/122 |
| 4,217,723 | 8/1980 | Hrebic | 43/122 |
| 4,244,135 | 1/1981 | Harwoods | 43/122 |
| 4,400,903 | 8/1983 | Seidenberger | 43/122 |
| 4,551,941 | 11/1985 | Schneidmiller | 43/122 |

Primary Examiner—Kurt Rowan

[57] ABSTRACT

This invention relates to the use of a poisoned substance to kill flying insects and to the isolation of this substance from the surrounding environment.

It deals specifically with the use of a device that will attract the insects into an enclosed are that has been coated with a toxin capable of destroying them, and when dead, will allow for the collection of the insects in a sanitary manner.

Additionally, the use of this device will enhance the efficacy of a given insecticide by providing the basis for the collection and formation of natural pheromone secreted by the insects.

4 Claims, 1 Drawing Sheet

TAMPER RESISTANT FLYING INSECT CONTROL DEVICE

BACKGROUND OF THE INVENTION

Houseflies and other flying insects represent one of the major pest control problems that face both professional pest control operators, farmers and home owners today.

Because they breed at very rapid rates and can cover vast areas in their search for food and water, they are extremely difficult to control.

Many methods of exterminating these creature have been developed over the years and they range from the common type fly swatter, through chemical sprays and into sophisticated electric shock devices.

Some of the developments that are representative of attempts to control flying insects are taught in patents that have been granted through the years such as U.S. Pat. Nos. 3,653,145, 4-1972. Stout, class 43/131-4,160,335, 7-1979 Von Kohorn, class 43/131-4,411,093, 10/1983 Stout et al, class 43/131 and Sherman, allowed 5/23/89, class 43/131.

These devices represented improvements in the techniques of flying insect control but they did not fully address all of the problems of bringing the insects to a defined area for the application of an insecticide, nor did they address the issue of safely presenting an insecticide in a tamper-resistant method, and they further did not address the issue of enhancing the effectiveness of an insecticide by utilizing the natural pheromones that many flying insects such as houseflies excrete as part of their bodily functions.

The instant invention address these factors and many more in that it presents an insecticide that has been coated on the the interior of a dispensing device in such a way as to allow the insect easy access to the treated area, but in a manner that precludes non target species and prying hands from coming into contact with the treated surfaces.

Additionally, the instant invention takes into consideration the attraction that flies have to their own species and the natural attractiveness of the muskamone pheromone that is produced by flies as part of their biological makeup.

Houseflies produce the pheromone muskamone as they fly and this is demonstrated by the cluster effect that an observer will notice as large groups of flies congregate in specific areas both and flight and at rest on a surface.

It can also be observed as a by product of dead flies, and the observer will notice that live flies are attracted to the bodies of dead flies by actually following the scent of this powerful natural attractant.

An object of the instant invention is to increase the effectiveness of the device by the use of this natural pheromone and by collecting the dead insects in a manner that will draw live insects into the treated area.

Further, the instant invention will protect the applied insecticide from deterioration due to climatic conditions such as rain, and will further isolate the insecticide from deterioration due to ultra violet rays emanating from the sun which can break down the chemical characteristics of many insecticides in a very short time.

And, the instant invention allows a viscous insecticide to be coated on to a surface without the fear of the insecticide running from said surface when exposed to varying temperatures that may apply to the conditions that can be found over wide geographical area.

And another advantage of the device is that it causes dead flies to be collected in a manner that in sanitary and will not contaminate the surrounding area with parasites or germs that flies are known to carry.

These and other novel feature of the instant invention will be demonstrated in the accompanying drawings and outlined in the descriptions of the art.

The scope and teachings of this invention not limited to these drawings and descriptions, but rather teach a broad method of application for the containment and dispensing of insecticides in a safe and effective manner.

DETAILED DESCRIPTION OF THE DRAWINGS

Figure 1:
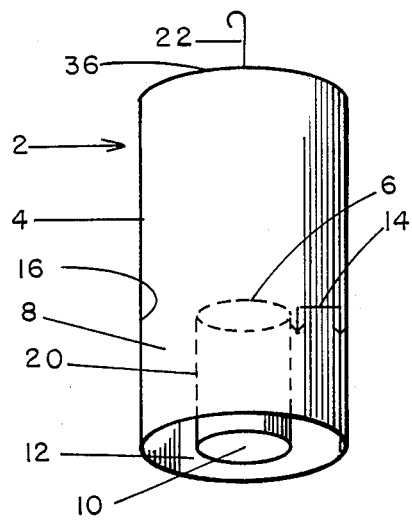
FIG. 1 is a depiction of the overall shape of the Tamper-Resistant Flying Insect Control Device showing a full perspective of the device as it might be if constructed as a circular tube. We can see in this depiction the open bottom portal that allows the flying insect access to the interior of the device and the relationship between the inner baffle structure that shields the coated interior surface on the outer wall and the outer wall itself. A hook for hanging the device from a lofted position is shown and the distance between the inner and outer walls are demonstrated showing the trough that is formed between these structure to capture the dead insects. The geometrical shape, although depicted as circular, can in fact be and combination of shapes, similar or dissimilar that allows a trough to be formed and that presents a baffle to any non target species that might attempt to reach the coated surface.

In FIG. 1 we see the Tamper-Resistant Flying Insect Control Device depicted generally as 2 and in the shape of a vertical tube extending downward with its top end 36 closed, and the opposing end partially closed by wall 12 but with an opening 10 to allow insects to enter the device. The device 2 is shown to be constructed a chamber between its exterior wall 4 and its interior wall 20, said chamber having a space indicted as 14 that allows dead insects to fall and be collected. The interior of exterior wall 4 has been coated with an insecticide 8 to a height approximately equal to the interior height of the centrally disposed baffle wall 20. The interior of wall 4 above the treated area 8 is designated as 16 and has not been treated with an insecticide.

Figure 2:
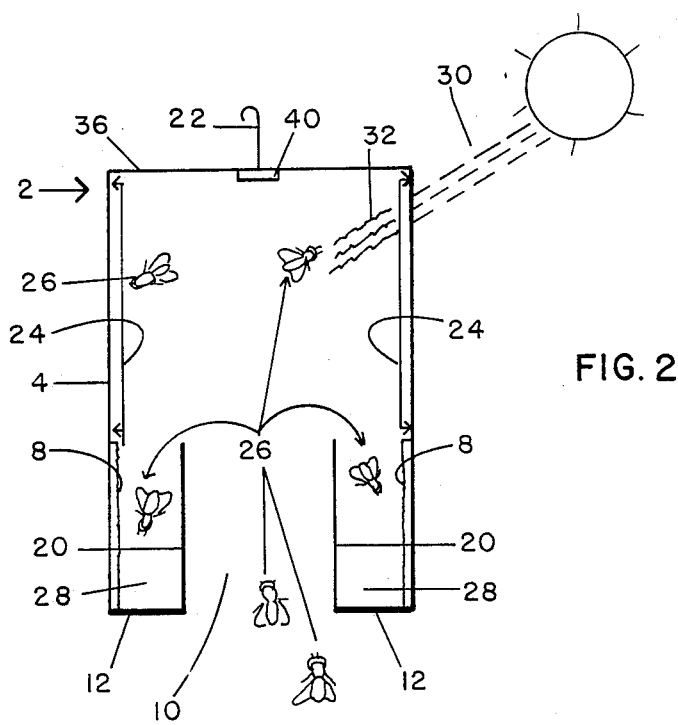
In FIG. 2 we see a cutaway side view of the Tamper-Resistant Flying Insect Control Device that depicts the relationship of all the elements of the construction. The bottom access portal is clearly defined and the insect can be seen entering on a track that leads the to the interior chamber of the device. We can see that the walls of the central interior baffle extent only partially upward into the chamber and that the insecticide coating extends from the bottom of the device to an area that is basically even with the top of the interior baffle. This allows flies that are negatively geotropic to enter the chamber from the bottom, light on the interior upper walls, and find their way down to the coated surface to feed on or contact the insecticide. As the flies die they are then caught in the trough formed between the inner baffle and the outer wall. The effect of having the flies in this confined area provides a sanitary method of collecting the dead insects and, adds to the efficacy of the insecticide by utilizing the muskamone pheromone as an attractant to draw more flies into the device. Also shown in this drawing is the method in which the device filters out UV rays which must pass through the outer wall in order to reach the insecticide that has been placed on the inner wall. This outer wall can be treated with a UV inhibitor to filter out the harmful rays.

In FIG. 2 we see a cutaway side perspective of the Tamper-Resistant Flying Insect Control Device 2 and we can see the relationship of the elements of the device. Insects 26 are attracted into the device by the use of natural or artificial attractants such as sugar (not shown) or a muskamone pad 40 placed in the interior chamber. They pass through the opening 10 at the bottom of the device and are caught in the upper chamber that is untreated with insecticide. As the insects light or fly around this untreated interior portion of the device 2 they expel the natural pheromones that are also trapped in the chamber, but which call be smelled by other insects passing by the opening 10. This effect enhances the attractiveness of the device and continues to draw insects into its interior chamber. The interior of the outer wall 4 of the device has been partially treated with a solid insecticide 8 that is attractive as a foodstuff to the insect. This insecticide may be mixed with a sugar material or laced with a pheromone and is adhered to the wall of the device approximately to the interior corresponding height of the baffle wall 20. The interior of wall 4 above that height 24 has not been treated with the insecticide. Therefore a person or non target species attempting to reach through the access portal 10 could not reach over the wall 20 in order to contact the insecticide 8. A small insect such as a fly 26 would have no difficulty in gaining access to the insecticide 8 as it roams freely in the device 2. The top of the device 36 is closed to prevent the insects from flying out and the bottom of the device is formed into a partially closed chamber being formed by the vertical baffle wall 20 rising partially into the interior of the device and being separated from the outer wall by a spacer 12 which forms a trough enclosure 28. As the insects encounter the insecticide 8 that has been coated partially up the interior wall, we see that they will fall into this trough 28 and eventually fill the trough to its top. These dead insects 26 will emit additional pheromone attracting the insect 26 not only to the interior of the device, but to the actual insecticide 8 coated wall. When the trough 28 has been filled to capacity, the coated surface 8 is in fact covered by insects and the killing activity of the device has come to an end. The top 36 has been fitted with a hook 22 that allows the device to be suspended from a ceiling or other appropriate fixture. We can also see that the wall 4 of the device has been coated with a UV inhibitor and that the suns rays 30 passing through said wall have had their UV rays filtered out resulting in a UV free spectrum 32 entering the interior. The wall 8 is made of a translucent material that allow light to pass through and will allow the user to see the activity within the device and to be able to judge how much of the capacity has been utilized within the chamber 28.

Figure 3:
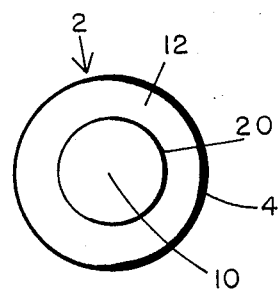
FIG. 3 is a bottom view of the Tamper-Resistant Flying Insect Control Device depicting the access portal in relation to the inner baffle walls and the outer wall. The closed bottom of the trough formed between these structure is depicted in the drawing.

FIG. 3 represents a bottom view of the Tamper-Resistant Flying Insect Control Device 2 showing the relationship of the walls and corresponding structures. We see depicted the outer wall 4, the spacing structure 12 and the inner baffle wall 20. The together form the entrance 10 leading into the interior chamber and in the vertical, the trough 28 that is formed between the wall 4, the wall 20 and closed by the spacer 12.

What I claim is:

1. A Tamper-Resistant Flying Insect Control Device; said device being constructed of an exterior tube having an interior tube wall; said tube being closed at one end with an opening at the opposing end; said opening at the opposing end having a partial closure; said partial closure having an interior tubular structure extending upward from said end partial closure extending part way into the interior of said exterior tube; said upward interior tube forming a trough in relationship with said partial end opening and said exterior tube wall; said interior tube wall having been coated with a solid insecticidal substance to a height that will allow insects to come into contact with said insecticidal substance but will not allow a person reaching in through said interior tube to come into contact with said insecticide; said trough forming a well into which dead insects will fall and be collected.

2. A Tamper-Resistant Flying Insect Control Device; said device being constructed as a tube; said tube being made of translucent material; said translucent material having physical characteristics that will cause ultra violet rays to be filtered out before reaching the interior of said tube.

3. A Tamper-Resistant Flying Insect Device as in claim 1; said device having a hook on the closed end of its structure to allow the device to be hung from an overhead fixture.

4. A Tamper Resistant Flying Insect Control Device as in claim 3; said device having a pheromone affixed to its interior to draw insects into the device.

* * * * *